April 4, 1961     J. M. LAPEYRE     2,978,334
PROCESS FOR EXTRACTING MEATS FROM CRUSTACEANS
Filed Oct. 7, 1957     2 Sheets-Sheet 1
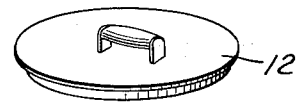
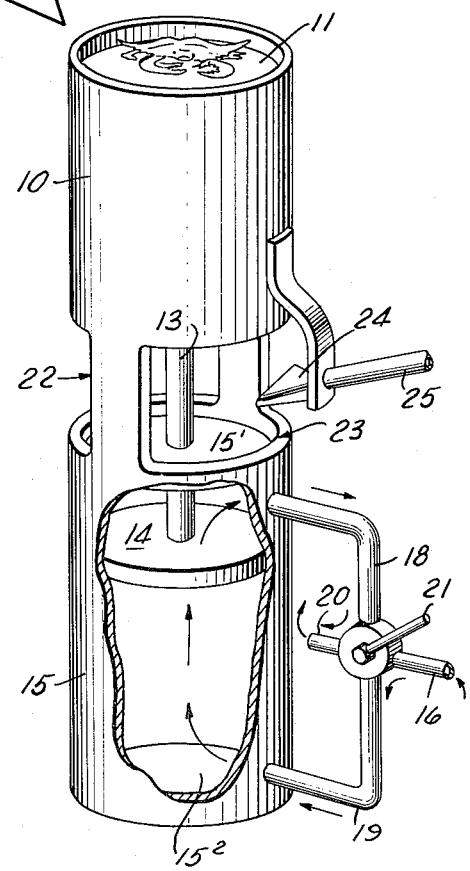
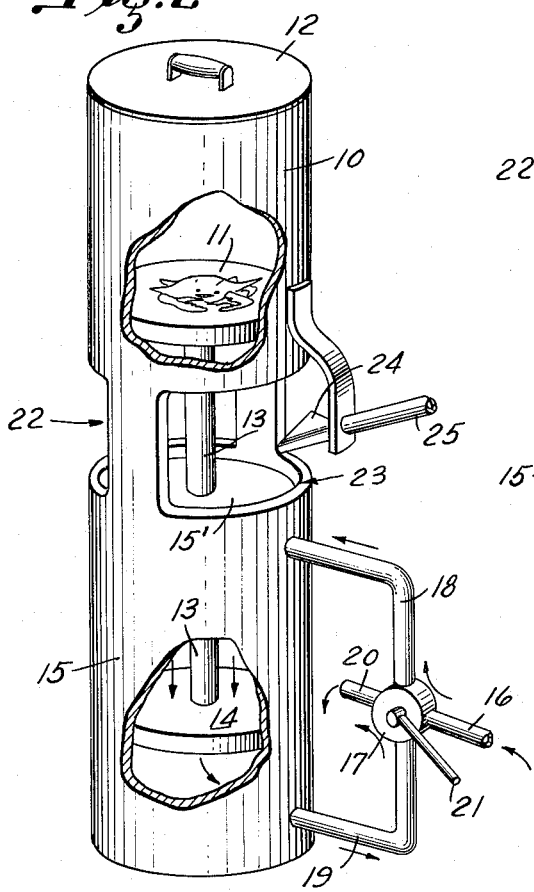
INVENTOR
JAMES M. LAPEYRE
BY
ATTORNEY

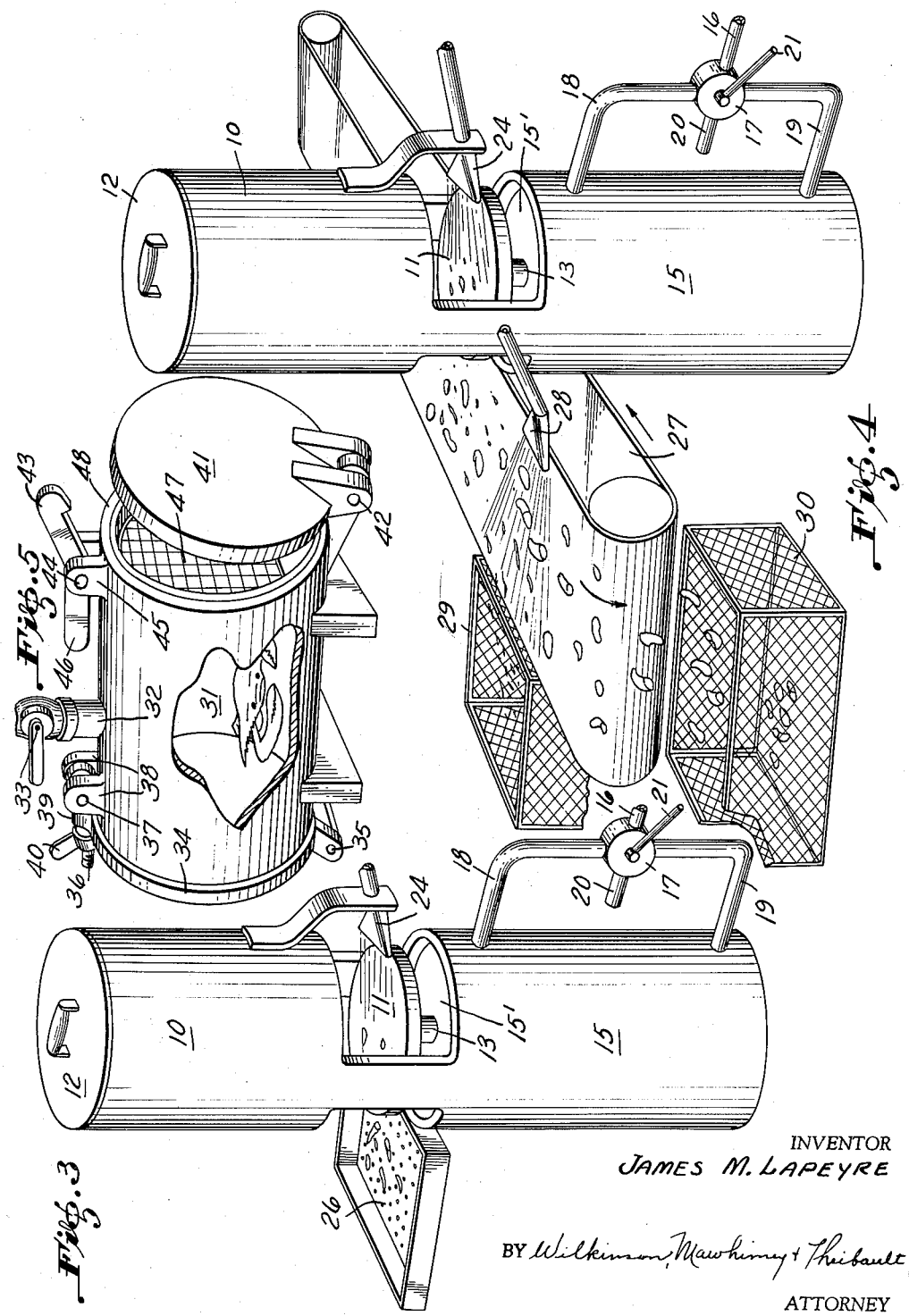

United States Patent Office 2,978,334
Patented Apr. 4, 1961

2,978,334
PROCESS FOR EXTRACTING MEATS FROM CRUSTACEANS

James Martial Lapeyre, New Orleans, La., assignor to The Peelers Company, Houma, La., a partnership of Louisiana Filed Oct. 7, 1957, Ser. No. 688,431

4 Claims. (Cl. 99—111)

The present invention relates to process and apparatus for extracting meats from crustaceans and for convenience in description the process and apparatus will be set forth as applied to crabs although it will be understood that the same is equally useful for extracting the meats from lobsters, crawfish, shrimp, oysters etc.

An object of the invention is to recover the meat in prime condition, that is without damage or injury to the meat which downgrades the same in the market.

Another object of the invention is to recover the meats in whole condition, that is in the lump which is a more valuable commercial form of the product, rather than in fragment or shredded form which cannot command the high price of the lump form.

A further object of the invention is to provide an improved process and apparatus for the extraction of meats from crustaceans in which uniformity of the product is assured, the steps of the process being few and easily performed and practiced in apparatus which is inexpensive, efficient in action and capable of operation by unskilled labor.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an isometric view with portions broken away and portions shown in section of an apparatus designed to carry out the process of this invention.

Figure 2 is a similar view showing the apparatus in a subsequent position.

Figure 3 is a similar view showing the apparatus in the discharge position after the exploding operation has been performed.

Figure 4 is an isometric view of the apparatus similar to that shown in Figure 3 but illustrating a modified form for separating the recovered meats from the shell and trash.

Figure 5 is an isometric view, with parts broken away and parts shown in section of a modified form of apparatus for carrying out the invention by a slightly different mode of operation.

The process of this invention consists essentially in solidifying the meat of the crab in its natural state, as by freezing, and thereafter exploding the crab so as to deliver the meat in the frozen condition undamaged from the shell.

However the following steps, in the sequence set out, will in all probability be found most convenient and complete for carrying out the process.

(1) Cooking the crab.
(2) Solidifying the crab including the meat, as by freezing.
(3) Exploding the crab.
(4) Separating the recovered frozen meat from the shell and trash.

(1) This first step is carried out by parboiling or cooking the whole crab. This cooking of the crab serves to drive out a portion of the moisture contained in the meat of the crab, thereby shrinking such meat within its particular cavity. Where it is desirable to extract the meat already cooked, this first step of cooking will be carried out but it is not absolutely necessary in order to effect separation.

(2) The second step includes solidifying the meat as by freezing the entire crab or that portion of the crab which contains the meat. This step solidifies the cooked or partially cooked meat into a hardened condition, rendering it substantially impervious to damage from mechanical shock or abrasion.

(3) The exploding step may be accomplished in two ways:

(a) By simply subjecting the crustaceans to a certain negative pressure, such as a very high vacuum in which the crustacean would explode due to its interior pressure suddenly becoming greater than its exterior pressure.

(b) By subjecting the crustaceans to high pressure, and thereafter releasing same after it has accumulated within the interior of the shells. The entire crab or that portion containing the desired meat is subjected to a gaseous pressure for a sufficient length of time to allow such pressure to enter and build up within the various cavities of the crab shell which contain the hardened edible meat which has been shrunken within its cavities due to the preliminary cooking operation. Pressures will build up within these cavities since there are small cracks or openings through the shell walls into the cavities which will allow seepage of the gas under pressure. This pressurizing of the crab will conveniently be conducted in a closed chamber having controlled access to a source of air or other gas under pressure. After this pressure has been built up internally in the crab structure, the gaseous pressure is suddenly released on the exterior of the crab which will permit the crab shell to explode due to its cavities containing gas under pressure which will expand rapidly when the exterior pressures are removed suddenly. This may be accomplished by suddenly opening the closed chamber to atmosphere after a pressure above atmospheric pressure is built up internally in the crab.

(4) Once the shells of the crabs have been exploded and the meat in its still frozen condition has become released from the shell and the shell structure of the crab, separation of the meat and the shells or trash can be made in a number of ways, for instance by flotation in chilled brine. A process and apparatus such as described is disclosed in application Serial No. 609,248, entitled Process and Machine for Shucking Oysters. Or the lightweight shells may be blown off or vacuumed off a conveyor which would receive both the heavy meat and the lightweight shells from the exploding apparatus.

Pursuant to the process, crab meat would be retained perfectly in its lump form and could be sold at premium prices, either frozen or canned.

It will be understood that the freezing step protects the meat from mechanical damage during the exploding operation.

The drawings show two forms of apparatus for carrying out the process.

Referring for the present to Figures 1 to 4 inclusive, 10 designates a chamber or cylinder in which a plunger 11 is fitted to reciprocate. The upper and lower ends of the chamber are open to atmosphere and the crabs or other crustaceans are adapted to be introduced to the plunger or platform 11 through the upper end of the chamber 10, after which a gasketed lid or self-sealing cover 12 is put in place upon the upper end of the chamber 10.

As shown in Figure 1 cooking and freezing units, so labeled, may be connected to one another in that order and to the open upper end of the chamber 10.

A connecting rod 13 couples the plunger 11 to a motor piston 14 which is fitted to reciprocate in a cylinder 15 disposed below the chamber 10 or in line therewith. The cylinder is closed at its upper and lower ends by cylinder heads $15^1$ and $15^2$. A pressure supply pipe 16 connected with a source of hydraulic air or other fluid pressure is connected to a control valve casing 17 from which diverge inlet branches 18 and 19 connecting respectively with the upper and lower portions of the cylinder 15 above and below the piston 14. An exhaust pipe 20 also extends from the control valve casing 17. The valve is operated by a handle 21.

The lower portion of the chamber 10 is provided with a lateral exist opening 22 which is disposed opposite a lateral spray opening 23 adjoining which is disposed a jet spray nozzle 24 in connection by pipe 25 with a water or gas supply under pressure.

In Figure 3 a skimmer or receptacle 26 is arranged opposite the exist opening 22 to catch the meat and shell as hereinafter described.

Figure 4 shows an alternate construction which dispenses with the skimmer 26 and replaces the same by an endless conveyor 27 from which the lightweight shells and trash are blown by a second spray nozzle or jet 28 into a trash receptacle 29. The meat which has been solidified and is heavier resists the action of the jet 28 and progresses to the end of the conveyor and into a meat receptacle 30 provided to receive the same.

In the operation of this form of apparatus, the cover 12 has been removed as shown in Figure 1 and the valve handle 21 turned to the "up position" so as to turn pressure into the lower portion of the cylinder 15 and evacuate the upper portion of such cylinder above the piston 14, all as indicated by the arrows in Figure 1. In this condition the pressure will drive the piston 14 and the plunger 11 upwardly to the upper position indicated in Figure 1. In this upper position of the plunger 11 one or more crabs or other crustaceans are placed upon the plunger or platform 11 and the lid 12 is replaced. It will be understood that these crustaceans have been received from the freezing unit and are completely frozen solid to and through the contained meat. The valve handle 21 is then thrown to the down position of Figure 2, causing the hydraulic, air or steam pressure to enter through the branch pipe into the upper portion of the cylinder 15 above the piston 14 and to allow evacuation of the pressure previously applied to the lower portion of the cylinder 15 below the piston 14. Under this action of the valve the lower piston 14 slams to its lowermost position and in turn through the connecting rod 13 pulls the top plunger 11 down suddenly. Such action causes a sudden vacuum to develop in the upper portion of the chamber 10 above the plunger 11 since the plunger 11 forms a leak-proof seal with the walls of the chamber or cylinder 10, and atmospheric pressure holds the lid 12 firmly in place. The frozen crab, which is at atmospheric pressure, explodes due to the internal atmospheric pressure moving out in all directions to attempts to satisfy the vacuum so produced externally of the crab. In this explosion the shell is blown from the solidified crab meat and the fragments of shell and the delivered frozen meats fall onto the plunger face which thereafter passes downwardly in a continuous motion to the position of Figures 3 and 4 where the exploded crab is subjected to the stream from the jet 24. According to Figure 3 the trash and meat are both blown into a skimmer or receptacle 26 from which separation later takes place. Or according to Figure 4 the combined shell and meat may be blown or otherwise delivered from the platform or plunger 11 onto an endless conveyor 27. As the trash moves past the jet 28 it will be blown into the receptacle 29. The heavier meats however will continue on to the end of the conveyor and be deposited in the meat receptacle 30.

By reversing the control valve 17 the plunger 11 and piston 14 may be returned to the original loading position of Figure 1.

Referring more particularly to Figure 5, a pressure chamber 31 is herein shown having a pressure inlet pipe 32 in communication with a source of preferably gaseous pressure, which pressure may be permitted to enter the chamber 31 under control of a pressure control valve 33 until a suitable pressure is built up in such chamber.

A loading and unloading door 34 is hinged at 35 to the chamber end wall and is self-sealing, being held tightly against the entrance end of the chamber 31 by a latch bolt 36 or other appropriate device. In Figure 5 the latch bolt is shown as being pivoted on a pivot 37 entered through spaced ears 38 on the chamber wall. The bolt is adapted to pass downwardly between spaced lugs 39 on the door 34. A wing nut 40 run on the threads of the bolt 36 is adapted to be tightened up against the lugs 39 or against the door 34 to hold the door tightly in a sealed and closed position. At another location in the chamber 31 is a door or valve 41 for quick release of the pressure. Such door is shown as hinged at 42 and adapted to be kept closed by a catch 43 pivoted, at 44 in spaced ears 45 on the chamber wall. The catch may be operated by handle 46.

A screen or grid 47 is provided in the opening of the quick-release door 41 to prevent the blowing out of the shell and meat when the door 41 is opened. A sealing gasket 48 will preferably be provided for the door 41.

In operation, crabs or other crustaceans are placed inside the chamber 31 through the open door 34. The door is thereupon tightly closed and the valve 33 opened to admit pressure into the chamber 31. It is understood of course that the door 41 is closed and held tightly against the gasket 48 by the catch 43. A gaseous pressure is thereupon built up within the chamber 31 over a time period which will insure that this pressure penetrate to the innermost recesses of the shell of the crab.

The door 41 may be suddenly opened by delivering a blow upon the handle 46. The pressure within the chamber will then simply blow the door valve 41 open about its hinge 42 and there will be a sudden reduction in pressure in the chamber 31 and externally of the crustacean. It will be understood that the pressure internally of the crustacean is considerably higher than atmosphere pressure so that when the door 41 is suddenly opened the internal pressure within the crab 31 will explode the crab and deliver the internal meat. The door 34 is thereupon opened and the trash and meat removed to a separation process.

It will be understood that the drawings show only two forms of apparatus for carrying out the method of this invention and conceivably many other forms of apparatus may be employed for accomplishing the essential steps of the process.

Although I have disclosed herein the best form of the invention known to me at this time, I reserve the right to all such modifications and changes as may come within the scope of the following claims.

What is claimed is:

1. The process of extracting meats from crustaceans consisting in freezing the crustacean and suddenly lowering the pressure on the outside of the subject crustacean relatively to the internal pressure.

2. The process of extracting meats from crustaceans which consists in freezing the crustacean to solidify its meats, and subjecting the frozen crustacean to a sudden sharp drop in external pressure relative to its internal pressure to thereby explode the crustacean incident to rapid expansion of its internal pressure.

3. The process of extracting meats from crustaceans which comprises solidifying the meat within the crustacean and subjecting the crustacean to a partial vacuum to induce bursting due to the pressure drop across internal and external parts of the crustacean.

4. The process of extracting meats from crustaceans which comprises solidifying the meat within the crustacean, pressurizing the crustacean to raise its internal pressure above atmospheric pressure, and suddenly releasing the crustacean to atmospheric pressure.

References Cited in the file of this patent

UNITED STATES PATENTS

| | | |
|---|---|---|
| 1,445,742 | Blair | Feb. 20, 1923 |
| 2,490,112 | Winters | Dec. 6, 1949 |
| 2,501,655 | Altenberg | Mar. 28, 1950 |
| 2,771,630 | Hiller | Nov. 27, 1956 |
| 2,771,631 | Hiller | Nov. 27, 1956 |
| 2,787,549 | Heald | Apr. 2, 1957 |
| 2,824,004 | Seal | Feb. 18, 1958 |
| 2,824,005 | Strasburger | Feb. 18, 1958 |
| 2,824,006 | Strasburger et al. | Feb. 18, 1958 |
| 2,858,223 | Harris | Oct. 28, 1958 |